United States Patent [19]
Crisp et al.

[11] 4,035,741
[45] July 12, 1977

[54] MAGNETIC POLARIZATION OF TUBULAR LASER

[75] Inventors: Michael D. Crisp, Sylvania; James A. Ringlien, Maumee, both of Ohio

[73] Assignee: Owens-Illinois, Inc., Toledo, Ohio

[21] Appl. No.: 656,468

[22] Filed: Feb. 9, 1976

Related U.S. Application Data

[63] Continuation-in-part of Ser. No. 550,077, Feb. 14, 1975.

[51] Int. Cl.² .......................................... H01S 3/10
[52] U.S. Cl. ...................... 331/94.5 G; 331/94.5 D
[58] Field of Search ..................... 331/94.5; 330/4.3

[56] References Cited
U.S. PATENT DOCUMENTS

| | | | |
|---|---|---|---|
| 3,413,568 | 11/1968 | Gordon et al. | 331/94.5 G |
| 3,464,024 | 8/1969 | Bell et al. | 331/94.5 C |

OTHER PUBLICATIONS

McMahon, A Means For Externally Polarizing He-Ne 6328A Lasers, Rev. Sci. Instr., vol. 40, No. 5, (1969), pp. 727-728.

*Primary Examiner*—William L. Sikes
*Attorney, Agent, or Firm*—S. M. McLary; E. J. Holler; D. K. Wedding

[57] ABSTRACT

There is disclosed the magnetic polarization of a tubular gaseous laser device comprising a laser capillary tube with anode and laser end pieces, a cathode, a cathode envelope, and a gas exhaust stem for filling the device with a laseable gas. Magnetic polarization of the light output from the laser is achieved by applying a magnetic field to the lasing capillary and the rotation of the laser within the magnetic field to optimize the extinction ratio.

4 Claims, 7 Drawing Figures

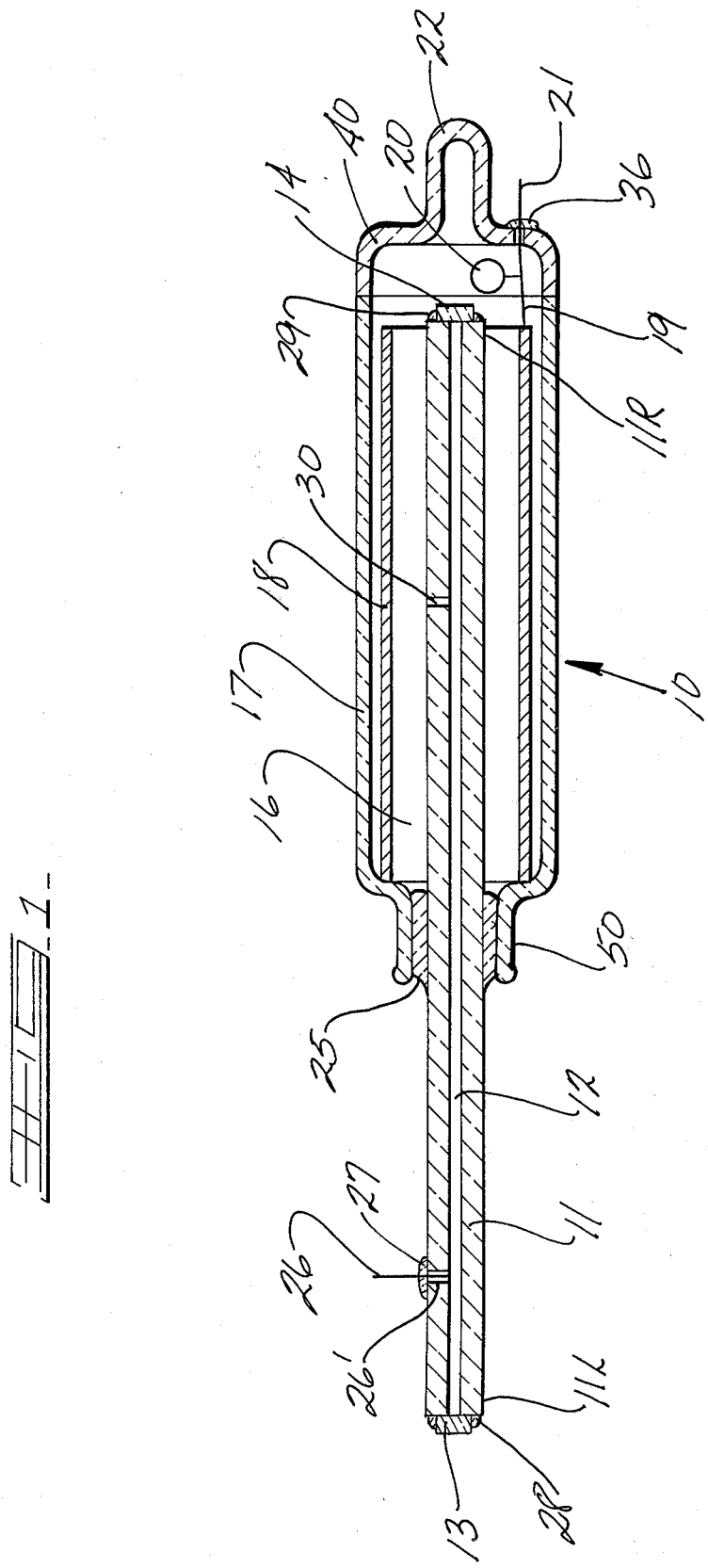

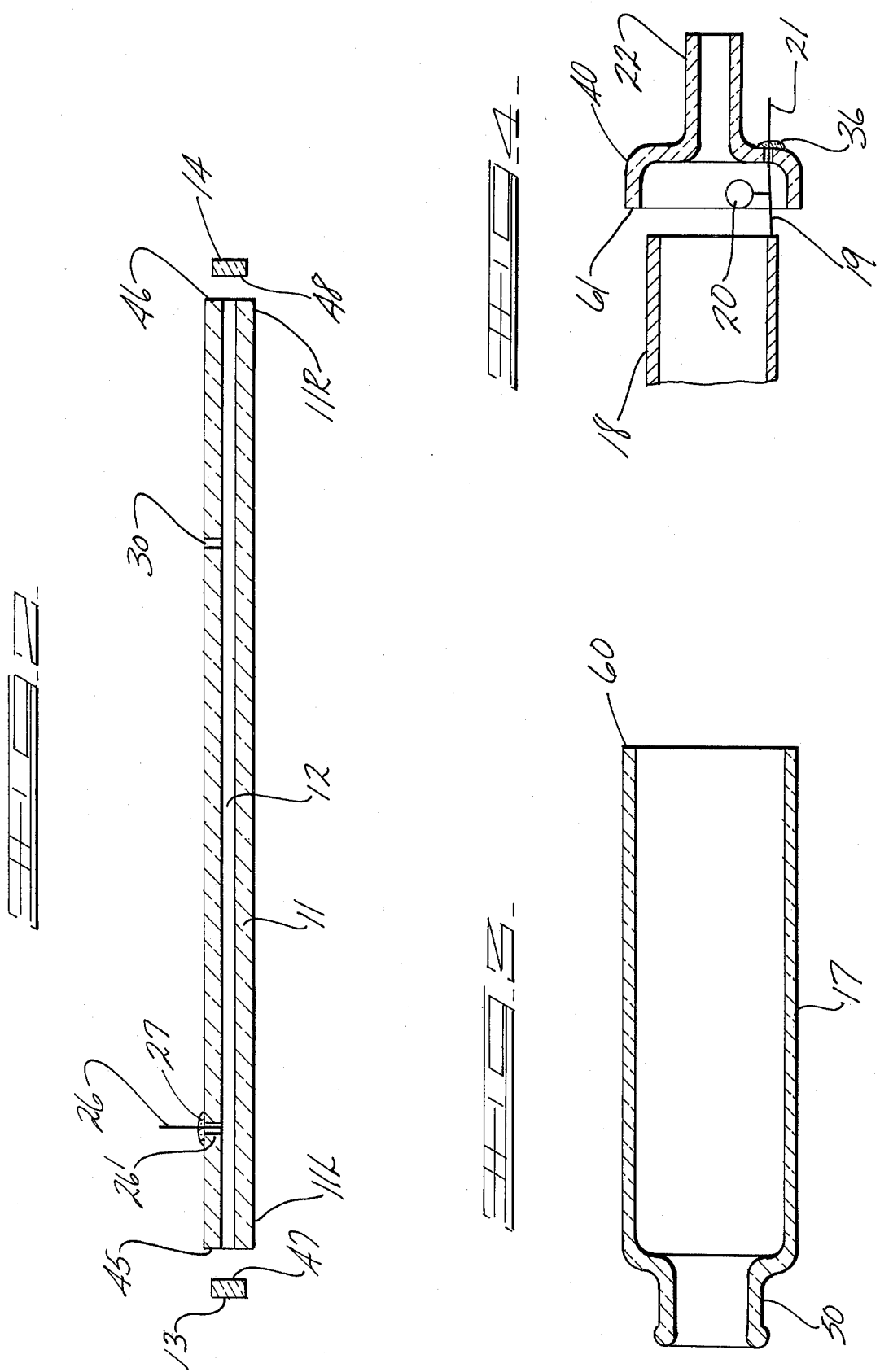

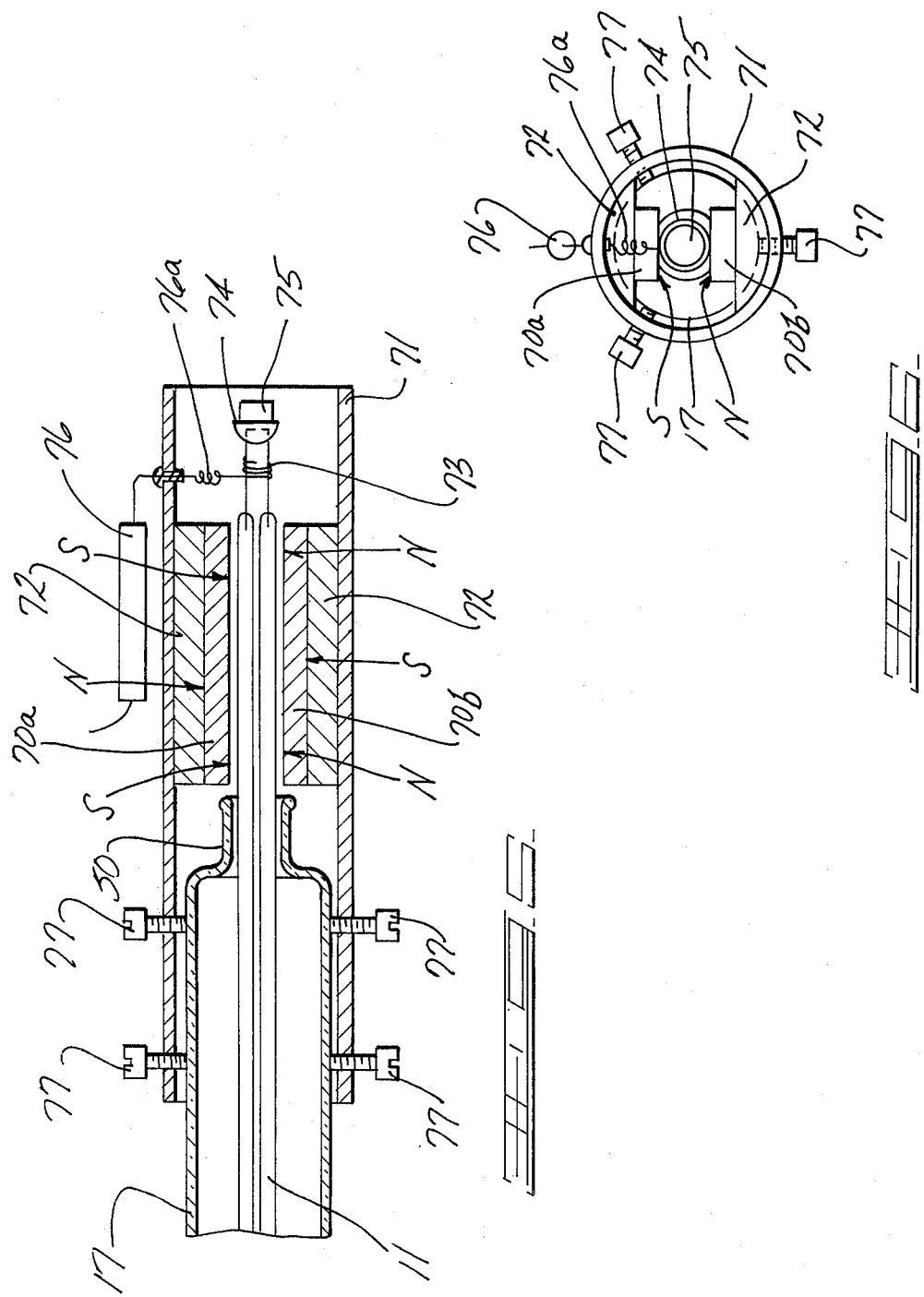

MAGNETIC POLARIZATION OF TUBULAR LASER

CROSS-REFERENCE TO RELATED APPLICATIONS

This application is a Continuation-in-Part of copending application Ser. No. 550,077, filed Feb. 14, 1975.

INTRODUCTION

This invention relates to the magnetic polarization of gaseous tubular lasers and more particularly a compact tubular gas laser construction which provides simplicity and economies in manufacturing operations and yet at the same time a high degree of ruggedness and long lived operation. According to the present invention, three laser subassemblies are fabricated and each separately tested to assure high quality, these sub-assemblies being constituted by (a) an exhaust stem with cathode leads and getter, (b) a cathode envelope and cathode and (c) a laser capillary with anode and laser end pieces, such as mirrors, Brewster windows, etc. The advantages of these basic sub-assemblies are that solder glass seals can be made at relatively low temperatures and at device locations and heating cycle times such that no contaminatory effects are introduced into the component parts nor are there any fabrication complexities introduced by the subassembly approach disclosed herein. Instead, fabrication simplicity and certainty is achieved. Moreover, an economic saving is achieved by permitting the individual components to be tested for quality construction prior to final assembly into an operating laser.

Since the laser capillary is manufactured as a separate component and the anode attached thereto, along with laser mirrors and/or both other laser end pieces, the mirror seating, grinding and mounting are relatively easy and can be completely tested before committing this laser tube sub-assembly attachment to the cathode envelope. Moreover, the cathode envelope is such as to encompass the fully reflecting end of the laser cavity so that only one mirror seal is outside the device which therefore assures less chance of leakage and insures better prospects for the success of the solder glass seal. The stem or exhaust tube and the glass to metal seals for the cathode lead-in, which constitutes the most difficult and tedious glass work, can be done on conventional equipment. The cathode envelope is provided with an elongated axial base portion of reduced diameter between which a solder glass sealant is provided for joining and forming a seal between the capillary and the cathode envelope with minimum opportunity for bending capillary. The type of final seal between the cathode envelope and exhaust stem is a simple fusion operation whereby a sealing flame is applied to the junction of the two sub-assemblies. Since the solder glass seals are made before the cathode material is inserted in the tube, the cathode material is not exposed to these sealing temperatures and the final hermetic seal is made at a location remote from the cathode material. The device is then gas filled and the exhaust stem sealed off.

The capillary is relatively short and supported near its center so that there is a long portion thereof extending beyond the cathode envelope to permit magnetic polarization of the small diameter exposed section of the capillary. Typically a minimum of about 2 inches of the exposed capillary length within the magnetic field will provide a high extinction ratio.

The extinction ratio is the ratio of maximum light intensity to minimum light intensity passed through a polarization analyzer. This ratio can be represented by the following equation:

$$R = I\,\text{Max.}/I\,\text{Min.}$$

The extinction ratio is related to the degree of polarization D by the following equation:

$$D = (R-1)/(R+1)$$

The above and other advantages and features of the invention will become more apparent from the following specification when considered in light of the drawings wherein:

DESCRIPTION OF THE DRAWINGS

FIG. 1 is a cross-sectional view of a gas laser structure of the type incorporating the invention;

FIG. 2 is a cross-sectional view of the laser capillary with anode and mirrors positioned for joining thereto, it being appreciated that this disclosure of FIG. 2 is as a sub-assembly or component which may be completely tested in a cathode envelope environment for proper alignment of the mirrors;

FIG. 3 is a cross-sectional view of a major portion of the cathode envelope, and FIG. 4 is a cross-sectional view of the exhaust stem with cathode and cathode portion and the getter.

FIGS. 5-7 illustrate the position and effect of opposing magnets on the laser capillary tube.

Referring to FIG. 1, the laser 10 is constituted by a laser tube assembly having a laser tube 11 which is a capillary tube having a bore 12 and relatively thick walls for mechanical stability purposes and maintaining at least the mirror ends 11L and 11R in optical alignment during normal use of the laser. In addition, in a manner to be described hereinafter, a solder glass seal 25 is formed between the outer exterior walls of capillary tube 11 and annulus 50 which is integral with the cathode envelope 17. Thus the laser capillary tube 11 is relatively short and advantageously supported near its center in a balanced assembly. Each end of the laser bore 12 is terminated by laser end pieces, shown as laser mirrors 13 and 14 at the left end 11L and right end 11R of laser tube 11. These mirrors are joined in assembly to the laser tube by solder glass sealants 28 and 29. An anode electrode 26 passes through a sealant 27 to a small transverse bore 26' to provide a pin anode for the laser.

Figure 7:
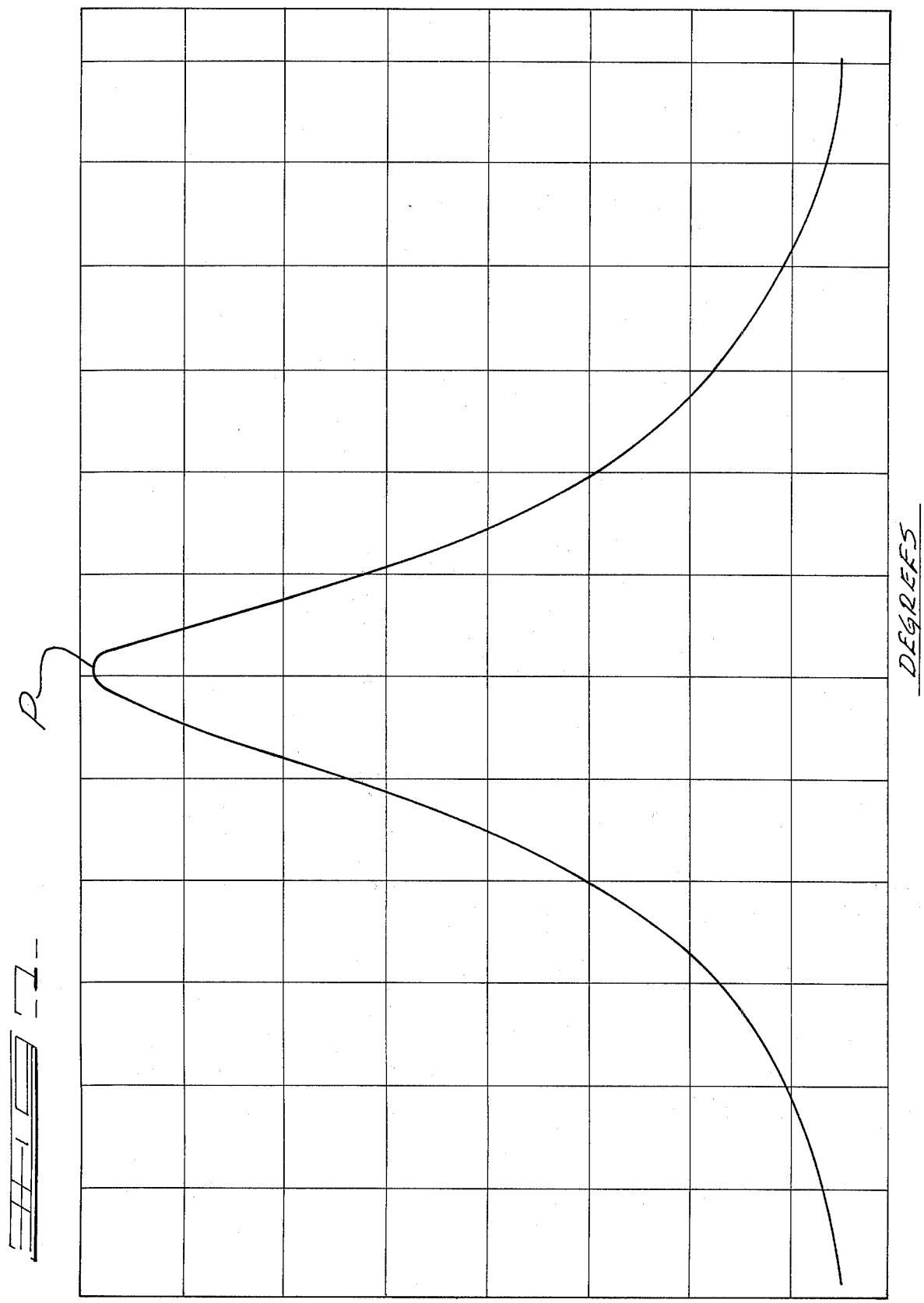

The cathode envelope is formed in two parts, a major portion labelled with the numeral 17 and a second portion labelled 40 which jointly form a cathode chamber 16 in which is located the cathode 18. In the embodiment shown cathode 18 is an aluminum cylinder connected by a lead 19 and getter 20 to a cathode lead in 21 which is sealed in an exhaust stem assembly by a glass-metal seal 30.

The laser capillary tube sub-assembly is provided with a transverse bore 30 which is positioned at approximately the center point of the cathode. An exhaust stem 22 is integrally formed with portion 40 of the cathode envelope and carries cathode lead in 21, getter 20 and cathode connection 19 along with the cathode 18, all of which may be carefully examined and tested as a sub-assembly.

In a further exhaust stem arrangement not illustrated in the drawings, the exhaust stem has a diameter less than the diameter of the cylindrical portion of the first sub-assembly so that the exhaust stem can be telescoped internally of the first sub-assembly and fused thereto after the joining of the second sub-assembly to the laser capillary tube by the solder glass sealant.

In a further embodiment of this exhaust stem arrangement, a plurality of metal pins extend through the header portion for structural support of the cathode and gas getter and for electrical connection to the cathode. Also electrical connectors to the getter may be necessary if the getter is not activated externally by RF (radio frequency) or electrical induction.

FIGS. 2, 3 and 4 show in detail the three sub-assemblies which are to be joined when each has been tested and known to be satisfactory. Thus, FIG. 2 discloses the cathode tube 11 with the mirrors 13 and 14 in a position to be joined to end surfaces 45 and 46 at the left end 11L of tube 11 and the right end 11R of laser tube 11. The ends 45 and 46 form mirror seats which may be ground prior to assembly and thereby making the mirror mounting relatively easy and further permitting this assembly to be completely tested in a test jig for operation. In other words, merely by enclosing the entire assembly shown in FIG. 2 in a test laser cathode envelope and applying operating potentials thereto, the device shown in FIG. 2 may be completely assembled tested and stored for subsequent assembly with other tested components. This sub-assembly of FIG. 2 can easily be assembled with cathode envelopes other than those shown herein.

The solder glass sealant 28 and 29 for the mirrors 13 and 14, respectively, may be made at the relatively low temperatures required therefor without exposure of any cathode material to such sealing temperatures. In like manner, the major portion of the cathode envelope 17, as shown in FIG. 3, has an end annulus 50 which has a diameter greater than the diameter of the capillary so as to form a cylindrical space between the capillary tube 11 and annulus 50. The low temperature solder glass sealant fills the cylindrical space and forms a unitary support and seal for the laser capillary tube 11, it being noted that the ends 11L and 11R are unsupported in the assembly as shown. Laser mirror 14 is fully reflective mirror so the optical properties of the exhaust stem assembly is not important for laser operation. However, it will be appreciated that the exhaust stem 22 may be offset from the axial alignment shown with the bore 12 and the end mirror 14 and an optical coupling permitted thereby if desired. As indicated earlier, the laser capillary sub-assembly can be incorporated in other forms of cathode envelopes.

In FIG. 4, a portion of the aluminum cathode cylinder 18 is shown connected to its lead conductor 19 and getter 20 which are supported on a cathode lead-in 21. Optionally these may be separately supported. The cathode lead in passes through a solder glass sealant 30 and this assembly as in the case of the sub-assemblies shown in FIGS. 2 and 3, may be completely examined and tested for prior to assembly. It will be noted that the exhaust stem 22 is shown as open in this case. Moreover, the ends 60 on the cathode envelope and 61 on the exhaust stem sub-assembly have been adapted for flame sealing (or solder glass sealing) and it will be noted that this is done after the cathode envelope 17 and the solder glass seal therefor with respect to tube 11 has been completed. In other words, the cathode 18 is simply slipped telescoped inside the envelope 17 after it has been joined to the tube 11. The cathode cylinder 18 may easily be replaced by a thin film cathode which is evaporated upon the interior walls of envelope 17 with electrical contact thereto being made by a spring contact lead in.

The free end of the laser capillary 11 to the left of solder glass seal 25 permits a strong transverse magnetic field to be applied for magnetic polarization.

Formation of the cathode envelope in two sub-assemblies and fusing one sub-assembly to the other after joining or making the solder glass seal 25, avoids contamination and destruction and shortening of the life of the cathode 18. The fill tube 22 can be attached to conventional glass processing equipment and flame tipped or pinched off after this operation has been carried out.

THE INVENTION

In accordance with this invention, there is provided a tubular laser construction having a gas lasing capillary, wherein:

a. a permanent magnetic field is applied to the capillary so as to polarize light being emitted from the capillary; and b. the laser is oriented within the magnetic field so as to obtain a maximum extinction ratio by the rotation of the laser within the magnetic field until the magnetic field is parallel to an optimum direction for polarized light being emitted from the laser.

The magnetic field may be conveniently applied by any suitable means, i.e. with electromagnets and/or permanent magnets.

Typically two opposing permanent magnets are used, each magnet being positioned in an opposite position on the outside or exterior surface of the capillary. The geometric length of the magnet is typically equvalent to the length of the capillary between the anode and the axial bore portion of the cathode envelope. However, shorter or longer magnetic lengths may be utilized.

FIGS. 5 and 6 illustrate the positioning of opposing magnets 70a and 70b on a capillary 11. The polarization of each magnet is in a direction perpendicular to the length of the capillary. The direction of magnetic polarization is indicated in FIGS. 5 and 6. Also shown in the FIGS. 5 and 6 are a cathode envelope 17, an axial bore portion 50, a cylindrical anode 73 with a mirror piece 75 and a solder glass seal 74, a ferromagnetic collar 71 (i.e. a steel or iron pipe), a ferromagnetic spacer and magnetic support 72, teflon mounting screws 77, ballast resistor 76, and electrical lead in 76a to the anode 73.

The ferromagnetic collar or yoke is important in that it transmits magnetic flux or lines of force from one magnet to the other. This greatly improves the overall efficiency of the magnet and increases the magnetic field in the capillary in excess of 100%. Thus if the magnetic field in the capillary is about 500 gauss, the collar will increase this to at least 1000 gauss.

With each opposing magnet having a length of 2.5 inches, extinction ratios in excess of 1000:1 have been obtained. Extinction ratios of at least 10:1, preferably at least 500:1, are desired.

The magnets also are greatly beneficial in the suppression of infra-red output at 3.39 microns of wavelength.

FIG. 7 represents a plot of extinction ratio versus degrees of rotation of the laser (within the magnetic field) from an arbitrary starting point. The laser device is rotated until a peak or optimum extinction ratio is achieved, i.e. at point P in FIG. 7 or a few degrees down the slope in either direction from point P. The shape of the curve in FIG. 7 will remain relatively the same for each laser device. However, the exact values along each axis will vary.

OTHER FEATURES

The solder glass seals permit much higer temperature bake out in gas processing than do conventional organic (epoxy) seals — which contribute to processing time/lost as well as operating and shelf life. Shelf life is a particularly important consideration which is significantly improved through solder glass seals.

The laser device is filled with a wide variety of leaseable gases such as helium, neon, argon, krypton, xenon, radon, hydrogen, oxygen, nitrogen, mercury, carbon dioxide, carbon monoxide and so forth. Mixtures of gases may also be utilized such as helium and neon; carbon dioxide and helium, carbon dioxide and nitrogen; carbon dioxide, nitrogen, and helium; helium and neon; and carbon dioxide, nitrogen, helium and xenon. One preferred gas mixture is helium-neon, the typical composition being about 80 to 95% atoms of helium and 5 to 20% atoms of neon. One very specific composition is 87.5% atoms of helium and 12.5% atoms of neon.

The laser device is typically filled with a helium-neon gas mixture with the ratio of helium (in per cent atoms) to neon (in per cent atoms) ranging from about 2:1 to about 30:1, typically about 5:1 to about 10:1.

Although a wide variety of glass tubing material is contemplated for the practice of this invention, soda lime tubing has typically been used for the laser capillary and envelope. This has expansion of $93 \times 10^{-7}$ per $°C$ and a contraction of $113 \times 10^{-7}$ per $°C$. It is desirable that the mirror material expansion and contraction coefficients be sufficiently close so as to match the coefficients of the tubing. However, any difference in coefficients may be compensated by the solder glass used to seal the device. Typically there has been used Metrologic mirros made from float glass having an expansion of about $90 \times 10^{-7}$ per $°C$. Other glass tubing materials include borosilicates, soda lime, lime borosilicates, Crown glasses, and lead borosilicates.

Other glasses may also be used for the mirrors so long as the transformation or strain point temperature are above the firing temperature of the solder glass. This is important since the mirror coatings can be degraded at high firing temperatures.

Any glass used for mirrors must also be considered on the basis of its polishing characteristics and acceptance to coatings since these factors influence the economics of manufacture of laser quality mirrors. Typical mirror glasses which may be used include borosilicates, soda lime, lime borosilicates, Crown glasses, and lead borosilicates.

In any case, the materials system is not limited to a particular glass except for matters of expediency. The important criteria is that the mirror is of appropriate expansion and contractions with respect to the capillary, have a strain point temperature above the solder glass temperature, and have reflective coatings appropriate for the operation of the gas laser, e.g. an output of 6328 angstrom units for a HeNe gas laser. In one particular embodiment the inboard mirror is flat and the output mirror has a 30 Centimeter radius facing the flat mirror. Other radii arrangements may also be utilized.

Solder glasses, also referred to as low temperature sealing glasses, are used in order to seal and fire the device at low temperatures, e.g. at about 425° F or below, and mitigate the possibility of degrading the various glass components used in constructing the device, particularly the mirror and the mirror coating.

The important characteristics of the solder glass are: it is the crystallizing type so that repeated heat cycles will not permit previous seals to relax; seal temperatures are below the strain point so that the capillary will not bend; and the solder glass sealing temperature is below the strain point of the mirrors so that the coating properties are not compromised in repeated seal cycles.

The usual vehicle of amylacetate and nitrocellulose is typically employed to permit spatula or extrusion application to the laser joints. Firing does require vertical element positioning so that favorable direction of solder glass flow is achieved to effect a seal.

The solder glass mirror sealing is different from the usual practice in that the solder glass is not placed between the mirror and the capillary. It is applied as a filler or bead after the mirror has been precisely positioned with respect to the capillary bore. Considerable care must be exercised in preparation and application to achieve a vacuum-tight mirror seal.

Example of solder glasses include those disclosed in U.S. Pat. Nos. 3,127,278 and Re. 25,791, both of which are incorporated herein by reference.

A typical solder glass which may be used comprises about 65 to 80 percent by weight PbO, about 5 to 21 percent by weight $B_2O_3$, about 0.5 to 15 percent by weight ZnO, about 0.5 to 10 per cent by weight CuO, about 0 to 6 percent by weight $SiO_2$, about 0 to 5 per cent by weight AgO, about 0 to 10 percent by weight CdO, and about 0 to 5 percent by weight $Al_2O_3$.

The mirror end pieces are mounted using a so-called passive alignment system.

The purpose of the passive alignment system is to permit alignment of the output coupler of a He-Ne laser relative to the flat mirror so as to produce the necessary optical resonator without the need to evacuate, backfill with He-Ne and maintain a plasma within the device. The resonator is formed with atmospheric pressure air in the bore of the device. This is particularly desirable when solder glass is used to attach the mirrors. If the tube were evacuated when the solder glass-vehicle mixture is applied, severe gas and mirror contamination by the solder glass and vehicle may result.

The laser tube, with the flat 100% reflective mirror attached to the back end and perpendicular to the bore, is set up in two adjustable metal vees on an optical bench. One vee is near each end. The flat mirror is positioned at the focal point of a 30 cm F.L. lens. A beam from a frequency modulated ($\Delta f = \pm 40$ MHz) Spectra-Physics model 125 laser is passed through a 1.5 mm aperture and illuminates the center of the 30 cm focal length. The resulting focal spot falls on the flat mirror of the laser device being worked on. A thin white diffuser is placed over this mirror between the mirror and the lens and the operator looks down the bore of the tube toward the illuminating laser while adjusting the lateral and vertical position of the mirror end of the tube. When the operator sees the small bright spot on the diffuser centered in the end of the tube, he knows the beam is entering the center of the mirror end of the tube. The diffuser is then removed.

A ground glass with magnifier is placed about 8 inches from the open end of the tube and the operator looks into this while adjusting the vertical and lateral position of the open end of the tube. When he sees a pattern of maximum symmetry, he knows that the fraction of the illuminating beam that leaks through the flat mirror is now going down the center of the bore. This beam is diverging inside the bore similar to but not exactly like the desired lasing mode.

The output coupler is then placed on the open end of the tube and both held in place and moved vertically and laterally over the flat tube end by a micromanipulator. As the mirror is moved about, a position can be found where the tube-mirror combination transmits light quite strongly. This is the desired Fabry Perot resonance condition necessary for He-Ne laser operation. After peaking up this resonance, solder glass or epoxy is applied. This material is allowed to dry or harden while the micromanipulator holds the mirror in place.

Use of a frequency-modulated illuminating laser greatly facilitates passive alignment. Withoout frequency modulation, one has to wait for coincidence of a longitudinal mode of the illuminating laser with a longitudinal mode of the resonator under construction. The resultant flashing makes it very difficult to know if an increase in brightness is due to some adjustment made or to a mode coincidence. The illuminating laser is frequency-modulated with a peak-to-peak frequency sweep approximately equal to its longitudinal mode spacing. It is modulated at a frequency high enough so that to the eye the momentary mode coincidences look continuous.

Although this invention has been particularly described with respect to one particular best embodiment comprising a compact tubular laser, it is contemplated that this invention may be practiced with other gaseous tubular laser devices.

Examples of other tubular gas laser device structures contemplated in the practice of this invention include not by way of limitation those disclosed in U.S. Pat. Nos. 3,242,439 (Rigden et al.); 3,628,175 (Rigden); 3,768,034 (Haans et al.); 3,734,281 (Bouhuis et al.); 3,739,297 (Mark); 3,775,700 (Garman et al.); 3,781,708 (Henmi et al.) 3,784,927 (Rudolph); 3,851,272 (Shull et al.); and Re. 27,282 (Kolb et al.), all of which are incorporated herein by reference.

The laser is energized by any convenient means, typically with a direct current applied to the cathode and anode in excess of 1500 volts. The voltage may have to be in excess of 3000 volts in order to start the laser. An operating voltage of 2000 is typical. Ballast resistors in excess of 100,000 ohms are generally used between power source and the anode. The cathode is grounded. Best safety and operating performance is achieved by the grounding of the ferromagnetic collar and support.

We claim:

1. In a process for manufacturing a tubular gaseous laser device having a gas lasing capillary, the improvement which comprises:
   a. applying a substantially uniform permanent magnetic field to at least a portion of the capillary so as to polarize the light being emitted from the capillary; and
   b. rotating the laser device with respect to the magnetic field until the laser device is so oriented with respect to the magnetic field that a maximum extinction ratio is obtained for polarized light being emitted by the laser device.

2. In a tubular gaseous laser device comprising a cathode, an anode, a laseable gas, and a gas lasing capillary, the improvement wherein at least two opposing permanent magnets are juxtapositioned near the capillary to thereby create a substantially uniform magnetic field so as to polarize light being emitted from the capillary, said laser device being oriented with respect to said magnetic field such that a maximum extinction ratio is obtained for polarized light being emitted by said laser device.

3. The device of claim 2 wherein the magnetic field of each magnet is in a direction perpendicular to the length of the capillary.

4. The device of claim 3 wherein a ferromagnetic collar is positioned around the magnets so as to transmit magnetic flux from each opposing magnet to the other and increase the magnetic field in the capillary by at least 100%.

* * * * *